Jan. 6, 1970          A. A. SNAPER          3,488,105

COLOR-PRODUCING APPARATUS

Filed Oct. 21, 1965

INVENTOR.
ALVIN A. SNAPER
BY Allen E. Botney
ATTORNEY

United States Patent Office 3,488,105
Patented Jan. 6, 1970

3,488,105
COLOR-PRODUCING APPARATUS
Alvin A. Snaper, Chatsworth, Calif.
(2800 Cameo Circle, Las Vegas, Nev. 89107)
Filed Oct. 21, 1965, Ser. No. 499,185
Int. Cl. G02f 1/24
U.S. Cl. 350—158                             3 Claims

ABSTRACT OF THE DISCLOSURE

The present invention provides apparatus in which polarized and birefringent materials are used to selectively produce and display colors and color patterns. More particularly, white light is passed through a polarizing plate, then after through a layer of birefringent material, and, finally through an analyzing polarizer on which different areas are polarized differently from each other and from the first polarizing plate. The color obtained depends upon which area of the analyzing polarizer the light is passed through.

---

The present invention relates in general to apparatus for selectively producing and displaying colors and color patterns in response to an ordinary beam of white light and more particularly relates to apparatus of the kind mentioned in which polarized and birefringent materials are used and form an essential part of the apparatus.

In many instances where use is made of color, the color or colors are obtained by passing a beam of white light through one or more color filters by means of which all but the desired colors are taken out. However, such a technique is rather crude and cumbersome and, furthermore, has a number of other limitations associated with it that restrict its possible applications. Accordingly, there has been a long-felt need for a more sophisticated and versatile color-producing apparatus.

The present invention fulfills this need and it does so by making use of the phenomenon that colored light is obtained when ordinary white light is successively subjected to the processes of polarization and birefringence. More particularly, the present invention is based on the concept that white light passing through a polarizing plate, then a layer of birefringent material, and thereafter viewed through an analyzing polarizer, can be made to produce any colors or pattern of colors of the spectrum, which portion of the spectrum being dependent upon and controlled by either the characteristics of the birefringent material chosen, its thickness, the uniform strain characteristics, the angle of polarization of the analyzer, or combinations thereof.

Based on this concept, a first embodiment of the invention is provided with a face-to-face arrangement of three layers, namely, a pair of differently polarized layers between which is located a uniformly thick layer of birefringent material, one of the polarized layers having different planes of polarization over different regions thereof. A succession of different colors may be obtained by successively directing a beam of white light to different regions of the arrangement. On the other hand, a pattern of color may be obtained by simultaneously directing the beam to cover more than one region at a time. In a modification of this embodiment, instead of using a uniformly thick layer of birefringent material together with a polarized layer having different planes of polarization thereon, the same results are obtained by using uniformly polarized layers but a birefringent layer having varying birefringent qualities. This may be achieved either by varying the thickness of the birefringent layer or by varying its composition. Finally, in a second embodiment, as diverse and as complex a color scheme as is desired may be obtained by moving a film strip of varying birefringence between the polarized layers.

It is, therefore, an object of the present invention to provide an apparatus that facilitates producing color patterns of a varying nature.

It is another object of the present invention to provide an apparatus that is capable of converting an ordinary beam of white light into complex patterns of color.

It is a further object of the present invention to provide apparatus that facilitates the production of visual color displays and that is more versatile in terms of its possible applications than prior equipment of this kind.

It is an additional object of the present invention to provide apparatus for producing colors or color patterns from ordinary white light without the use of color filters.

It is still another object of the present invention to provide apparatus that can be programmed to convert white light to selected color patterns.

The novel features which are believed to be characteristic of the invention, both as to its organization and method of operation, together with further objects and advantages thereof, will be better understood from the following description considered in connection with the accompanying drawing in which several embodiments of the invention are illustrated by way of example. It is to be expressly understood, however, that the drawing is for the purpose of illustration and description only and is not intended as a definition of the limits of the invention.

Figure 1:
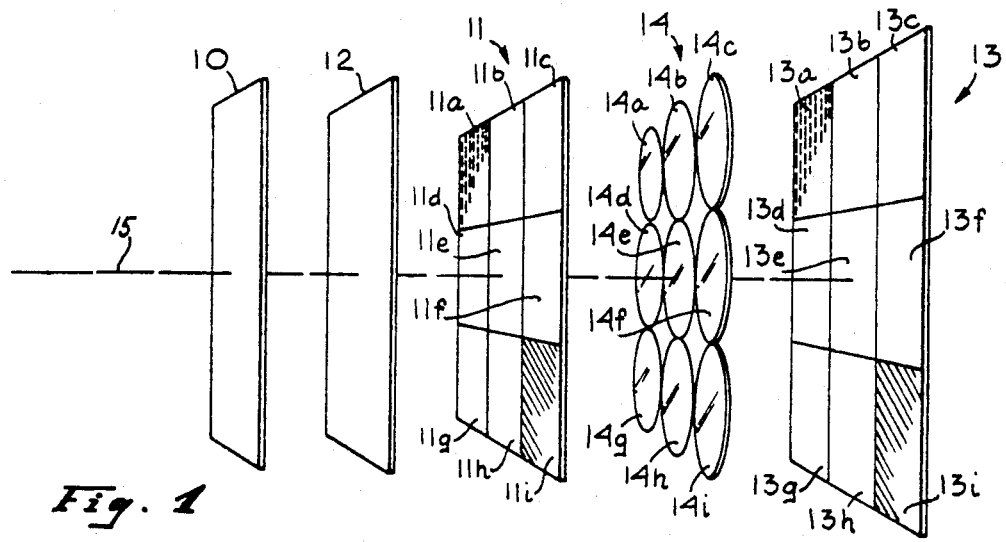
FIGURE 1 is an isometric view of a first embodiment of the invention in which the optical qualities of the polarizing material are varied rather than the qualities of the birefringent material.

For a consideration of the invention in detail, reference is now made to the drawing wherein like or similar parts or elements are given like or similar designations throughout the several figures. In FIG. 1, the embodiment is shown to basically include a plurality of layers that are in face-to-face relationship with one another and which may, if desired, be placed contiguous to one another to form a sandwich arrangement of them. More specifically, it includes a pair of polarizing layers respectively designated 10 and 11, and a birefringent layer 12 positioned between the polarizing layers. Also included is some sort of utilization means which, in the figure, is shown to be a screen 13, and a lens arrangement generally designated 14, mounted between the screen and polarizing layer 11. Also shown in the figure but not actually a part or an element of the invention is a beam of white light designated 15.

With respect to polarizing layers 10 and 11, the plane of polarization is the same throughout one of the layers whereas the other of them has different planes of polarization over different areas or regions of it, and these planes of polarization are different not only as to each other but preferably also different as to the plane of polarization of the first layer. More specifically, looking to FIG. 1, if layer 10 is uniformly polarized, then layer 11 is made to have two or more planes of polarization that are respectively different from that of layer 10. For purposes of example, layer 11 has been divided up in the figure into nine regions or areas designated 11a–11i wherein from two to nine different planes of polarization may be found. It will be recognized with respect to the example presented that if nine different planes of polarization are used, then the plane of polarization in any one of the nine regions or areas mentioned will be different from that in any of the others. On the other hand, it will be equally obvious that if less than nine different planes of polarization are used, then the planes of polarization in some of the regions or areas of layer 11 must necessarily be the same. For purposes of discussion, however, it will be assumed that regions 11a–11i respectively have nine different planes of polarization therein.

As for birefringent layer 12, in this embodiment it has the same qualities of birefringence throughout and, therefore, is made up of a material that has this constant characteristic. Many different transparent materials, such as most long chain polymer plastics, exhibit the quality of birefringence and may be used herein in layer 12.

Finally, lens arrangement 14 may be constructed in any one of a number of ways well known to those skilled in the optical arts, a preferred way being in providing an array of as many lenses in the arrangement as there are polarized regions on layer 11. Thus, in the example presented, lens arrangement 14 includes a plurality of nine lenses, designated 14a–14i, that are respectively in registration with polarized regions 11a–11i, each of these lenses, as will be seen later, therefore projecting light over a different region of screen 13.

Considering now the operation of the FIG. 1 embodiment, when a suitable beam of white light is directed through layers 10, 11 and 12, either a single color or a pattern of colors will appear on screen 13 depending, respectively, on whether the beam passes through one or more of polarized regions 11a–11i. Thus, for example, if light beam 15, after having passed through layers 10 and 12, is of such a width and location as to impinge only upon polarized region 11e, then a red beam of light will emerge from layer 11 and be focused by lens 14e onto an area of screen 13. If, for sake of convenience, screen 13 is divided into nine areas 13a–13i that respectively correspond to polarized regions 11a–11i and lenses 14a–14i, then the aforesaid red color will appear over screen area 13e. On the other hand, if light beam 15 is located so as to ultimately pass through another polarized region of layer 11, such as polarized region 11i, then another color, such as green, will appear in screen area 13i. The same would hold true for each of the other polarized regions through which the light beam might be directed, in each case a color appearing on the screen according to the polarized region involved. It will be recognized from what has been said that by suitably widening the white light beam or by using more than one such beam, two or more colors or a pattern of colors may be projected onto screen 13.

Figure 2:
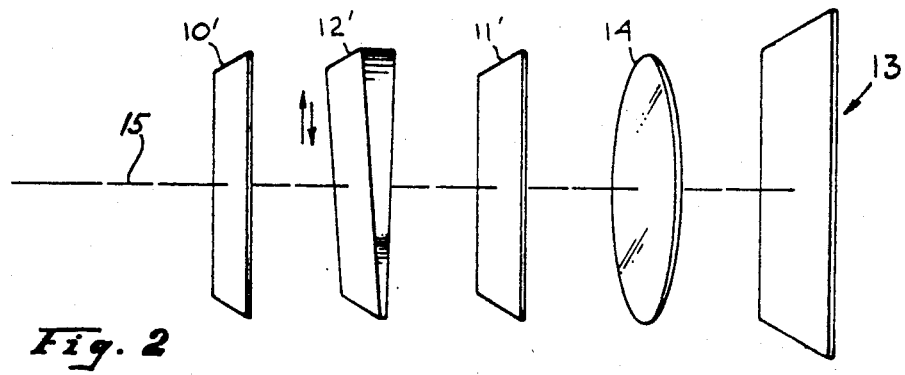
FIGURE 2 illustrates a modification of the FIG. 1 embodiment in which a birefringent layer of varying thickness is employed to provide the different birefringence effects.

In the FIG. 1 embodiment, the birefringence qualities of layer 12 are constant and color selectivity is made possible by means of the variably polarized regions of layer 11. However, the same results may be obtained by using instead a layer 11 whose plane of polarization is constant throughout, together with a layer 12 whose birefringence qualities are variable. Such a modification is illustrated in FIG. 2 wherein a birefringent layer 12' of varying thicknes is movably mounted between a pair of polarizing layers 10' and 11' whose planes of polarization are constant throughout each of them but with the plane of polarization of one of the two layers being at an angle with respect to the plane of polarization of the other. For a number of reasons, it is preferred that the two layers be cross-polarized with respect to each other. Finally, as before, there is included a utilization device, such as screen 13, and a lens arrangement 14 mounted between the screen and polarizing layer 11'.

In its operation, birefringent layer 12' is either rotated or moved linearly up and down at the same time that a beam of white light 15 is projected onto the surface of polarizing layer 10'. As a result, the plane polarized light emerging from layer 10' and thereafter successively passing through layers 12' and 11' is subjected to varying amounts of birefringence and this, in turn, results in changing colors of light emerging from polarizing layer 11' and focused by lens arrangement 14 onto screen 13. It should be noted that the color variations obtained in the manner described are focused to the same spot or area on the screen. However, if this is not important, then the same color variations may be obtained by keeping layer 12' stationary and sweeping the light beam back and forth instead since it is only relative motion between the light beam and layer 12' that is important.

Figure 3:
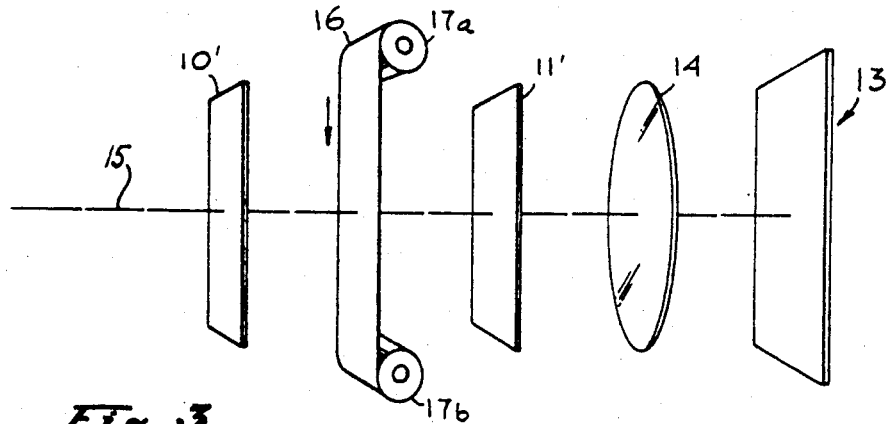
FIGURE 3 is an isometric view illustrating a second embodiment of the invention in which a film strip having varying birefringence qualities is moved between the polarized layers.

With this in mind, reference is now made to FIG. 3 wherein another embodiment of the invention is shown in which a strip of film 16 having different qualities of birefringence at different points thereon is substituted for layer 12' in FIG. 2. Film strip 16 is movably mounted between a pair of reels 17a and 17b and may be moved upwards or downwards between layers 10' and 11', whichever is convenient. Film 16 is of a kind on which different degrees of birefringence may be implanted or recorded and such film is known and commercially available. Hence, almost any kind of birefringence pattern may be recorded on film strip 16, including binary code, to correspondingly produce almost any output pattern of color. With respect to the other elements in the FIG. 3 embodiment, namely, polarizing layers 10' and 11', as well as lens arrangement 14 and utilization apparatus 13, they are the same and, therefore, to avoid being redundant, no further description as to them is deemed necessary here.

Although a number of particular arrangements of the invention have been illustrated and described above by way of example, it is not intended that the invention be limited thereto. By way of example, in FIG. 1, instead of shifting the position of the light beam to obtain different output colors at different times, it would be equally practical and effective to keep the light beam stationary and to appropriately shift instead the position of polarizing layer 11. Again, either in FIG. 1 or in FIG. 2, a birefringent layer made up of different compositions of material respectively having different birefringence characteristics could be substituted for those shown therein.

Having thus described the invention, what is claimed is:

1. Color-producing apparatus comprising: inner and outer light-transmitting polarizing layers whose planes of polarization are at an angle to each other, said polarizing layers being positioned in face-to-face relationship with one another; a layer of birefringent material mounted between said polarizing layers and in face-to-face relationship therewith, said birefringent layer including at least two materials respectively having different qualities of birefringence; means mounted to the rear of said outer polarizing layer for utilizing colored light incident thereon; a lens arrangement for focusing colored light emerging from said outer polarizing layer onto said utilization means, said lens arrangement including as many lenses as there are different birefringent materials, each one of said lenses being in registration with only one of said different materials wherein only one color is focused through a single lens; and apparatus for projecting a beam of white light onto said inner polarizer layer.

2. Color-producing apparatus comprising: first and second light-transmitting polarizing layers positioned in face-to-face relationship with one another, one of said polarizing layers having at least two regions thereon whereat the planes of polarization are different from each other and different from the plane of polarization of said other polarizing layer; a uniformly thick layer of birefringent material mounted between said first and second layers and in face-to-face relationship therewith; means mounted to the rear of said one polarizing layer for utilizing colored light incident thereon; and a lens arrangement for focusing colored light mounted between said means and said one polarizing layer, said arrangement including as many lenses as there are regions of polarization, each of said lenses respectively being in registration with only one of said regions wherein only one color is focused through a single lens.

3. The color-producing apparatus defined in claim 6 wherein said birefringent layer has at least two regions thereon whereat the birefringent qualities of the material are different from each other, there being as many different birefringent regions as there are different polarized regions on said one polarizing layer, said different birefringent regions respectively being in registration with said different polarized regions.

References Cited

UNITED STATES PATENTS

| | | | |
|---|---|---|---|
| 3,299,203 | 1/1967 | De Gibaja | 350—167 X |
| 3,391,296 | 7/1968 | Snapper | 350—158 |
| 2,689,879 | 9/1954 | Rehorn | 350—158 |
| 2,924,142 | 2/1960 | Nomarski | 350—157 X |
| 3,084,453 | 4/1963 | Brown | 350—167 X |
| 3,131,253 | 4/1964 | Zandman et al. | 350—158 |
| 3,054,204 | 9/1962 | Yates | 350—159 |
| 3,295,915 | 1/1967 | Eaves | 350—159 |

FOREIGN PATENTS 707,060   4/1954   Great Britain.

PAUL R. GILLIAM, Primary Examiner

U.S. Cl. X.R.

350—153